Feb. 27, 1951            L. FRANK            2,543,283
SCREW AND NUT DRIVING TOOL
Filed Jan. 15, 1949
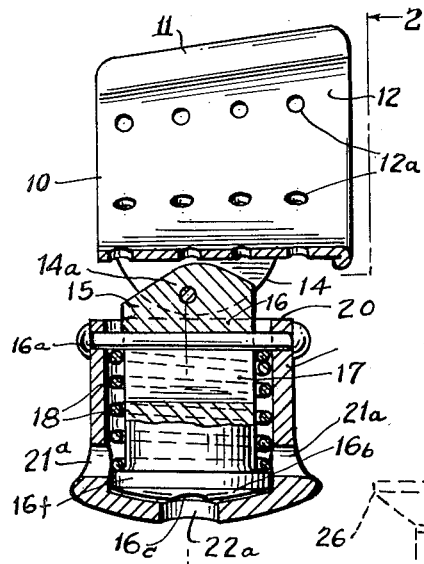
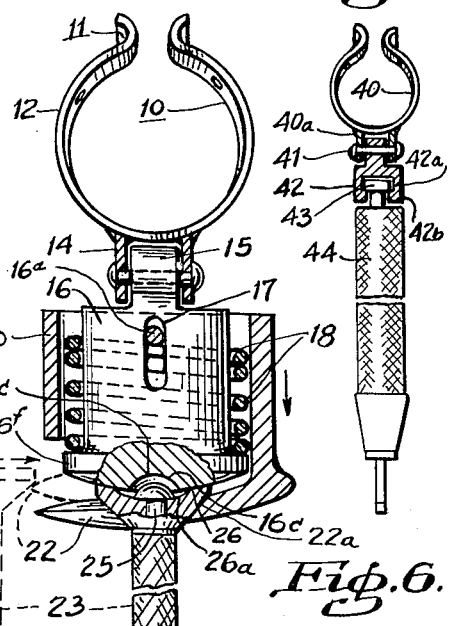
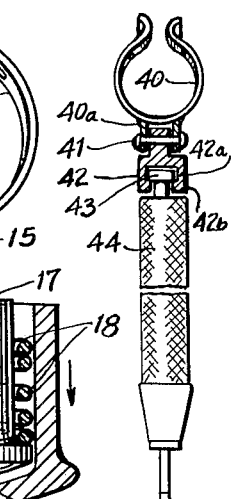
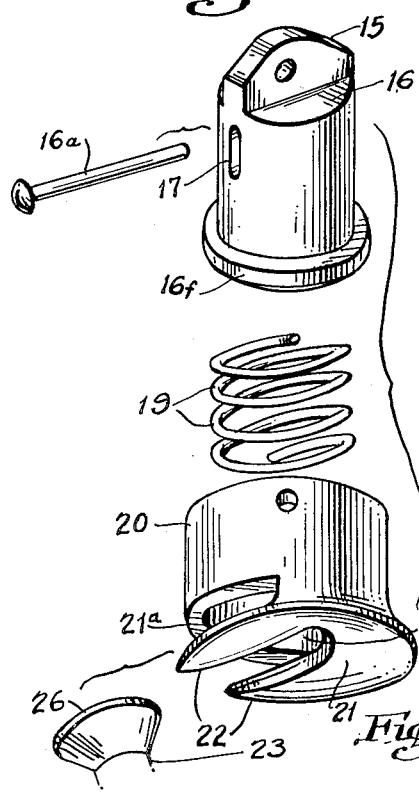
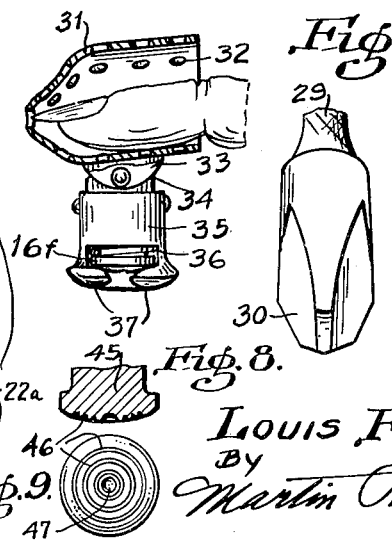
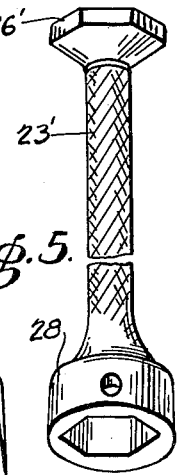
INVENTOR.
LOUIS FRANK
BY Martin P. Smith
ATTORNEY.

Patented Feb. 27, 1951

2,543,283

UNITED STATES PATENT OFFICE 2,543,283

SCREW AND NUT DRIVING TOOL

Louis Frank, Fellows, Calif.

Application January 15, 1949, Serial No. 71,098

2 Claims. (Cl. 81—1)

This invention relates to a screw or nut driving tool and more particularly to an improvement upon the screw or nut driving tool which forms the subject matter of United States Patent Number 2,440,854, issued to me May 4, 1948.

In said patent, I have described, for combination with the shank of a screw or nut driver, a thimble adapted to receive and be carried upon the end of the index finger, connection of said tool shank with said thimble being effected by means of a hollow nut screwed onto a block carried by said thimble.

It is an important object of the present invention to improve upon the aforesaid means for connecting the tool shank with the thimble so that the workman can more quickly attach the shanks of various tools to said thimble and as quickly remove them therefrom when it is desired to operate a different tool.

Another object pertains to the provision of an improved spring pressed connection between the aforesaid nut and tool shank whereby the tool shanks are more satisfactorily maintained connected to the nut during their operation of the device.

The present invention is capable of being used for the same purposes as those mentioned in my aforesaid patent, and, therefore, it is deemed to be unnecessary to enter into a detailed description of such uses in the present application, it being only necessary to state here that the device can be advantageously used whenever it is necessary to put into place considerable numbers of small screws or to apply other small, tool driven objects where a tool has to be rotated to put them into place.

With the foregoing and other objects in view, the present invention consists in certain novel features of construction and arrangement of parts which will be hereinafter more fully described in connection with the accompanying drawing, and then specifically claimed. Referring to said drawing:

Fig. 1 is a vertical mid-section of the complete device, shown per se, the plane of section extending lengthwise of the thimble.

Fig. 2 is a view wherein the structure shown in Fig. 1 is sectioned on angular line 2—2 on the latter view, except that the spring encircled block is shown mostly in elevation. In this view, a tool is shown partly in side elevation and partly in section, supported by the device. Also a fragment of the upper part of the tool's shank is shown in dotted lines in the left hand part of the view accompanied by an arrow indicative of moving said shank into the mounted position thereof shown in full lines.

Fig. 3 is an exploded view of the main parts of the device, indicative of the manner in which they are assembled, this view including a fragment of the upper portion of a tool shank in readiness to be applied to the device.

Fig. 4 is a view wherein the device is shown, partly in side elevation and partly in vertical mid-section, a modification of the thimble being illustrated. This view is on a smaller scale than the preceding views.

Fig. 5 is a perspective, fragmentary view of a tool adapted to be attached to the device.

Fig. 6 is a perspective view of a tool shank adapted to carry the tool head of Fig. 5.

Fig. 7 is a view partly in side elevation, and partly in section, showing the tool of Fig. 2 carried by another modification of the device.

Fig. 8 shows in vertical mid-section, showing on a smaller scale, a modification of the tool carrying head of Figs. 1, 2, 3 and 4.

Fig. 9 is a bottom plan view of the structure shown in Fig. 8.

Referring in detail to the drawing, and describing first the embodiment of the invention illustrated in Figs. 1, 2 and 3, the thimble member has the general shape of a short, open-ended tube with a longitudinally disposed slot 11 at its top, said member being formed of a thin, pliable, somewhat resilient material, for example, sheet metal, plastic or the like, in order that the thimble may be contracted or expanded to fit comfortably on the index finger of the workman's hand. By preference and as shown, said thimble is tapered slightly toward its forward end and is provided in its sides 12 with ventilating openings 12a.

Secured to the forward portion of the lower side of said thimble is a pair of arcuate pivot ears 14, a pin 14a bridging the space between said ears and passing through a lug 15 projecting upwardly from a cylindrical block 16 pivotally to secure said block to the thimble. Subjacent to said lug 15, a slot 17 extends diametrically through said block and receives with a working fit a pin 16a against which abuts the upper side of a coil spring 18 loosely coiled around the block 16, said spring being contained within a cup shaped member 20 diametrically across the upper end portion of which said pin extends. The lower end of said spring abuts against a bead or flange 16f around the lower end of said block 16.

As best shown in the lower part of Fig. 3, the cup 20 is provided with a bottom wall 21 which is downwardly convex and which is deeply diametrically cut away from one side thus providing opposed lips 22 and an intervening slot 22a. The contour of said lips is further determined by forming superjacent to them a deep, arcuate, horizontal slot 21a which extends through somewhat more than a semicircle, the inner ends of said slots appearing in Fig. 1 beyond the plane of section. Owing to the convexity of the bottom wall 21 of the cup 20, there is provided, in the upper face of said bottom wall, a shallow concavity and, when the spring 19 is allowed to expand, it presses into said concavity a convex lower face 16 with which the aforesaid block 16 is provided, said face 16b having in it a small central concavity 16c.

The block 16 and cup 20, constructed in the aforesaid manner, are adapted to cooperate to support in an operative position a tool shank 23, provided with a head shown in detail in Fig. 2. Said shank head is shown shaped like that of a conventional flat headed wood screw, except that a stud 25 is shown projecting centrally from the head 26 thereof, said stud having a convex head which is located centrally in a shallow, concave depression 20a in the outer face of said head 26.

In assembling the parts of the device shown in Figs. 1, 2 and 3, the cylindrical block 16 may first be inserted into the cup 20, then the coil spring 18 inserted into the annular space between said block and cup. Thereupon said spring will be compressed sufficiently to allow the pin 16a (at first headed at only one end) to be inserted across the open end portion of the cup and peened over in such a manner as to keep said pin in place. Then said block will be swingably connected with the paired ears 14 of the thimble 10 by means of the pin 14a.

In using the structure of the device thus far described to operate the tool shank 23, the head 26 of said shank will be moved laterally into the open side of the arcuate slot 21a in the lower end portion of the cup 20, the slot 22a in the bottom of the cup admitting the tool shank 23 as this is done. The convex bottom face 16b of the spring pressed block 16 will yieldingly oppose thus putting said tool shank head into place, but when the shank is fully inserted the convex head of the stud 25 will snap under the central recess 16c in the lower end of said block and will hold the screw shank securely in place, though not interfering with the subsequent removal of the tool or with the workman using the thumb and second finger of his hand to rotate the tool shank, while the forefinger of the same hand wears the thimble 10. The tool is more conveniently operable by reason of the swingable manner in which the pin 14a connects the block 16 with said thimble.

In the modification shown in Fig. 4, the thimble 31 is of a closed in character both as to its side portions and its outer end, and is provided with a larger number of ventilating apertures 32. The thimble ears 33 and part 34 are similar to the corresponding parts of the embodiment first described, but the cup 35 is provided in its lower part with a somewhat shorter slot 36 to cooperate with the laterally slotted bottom 37 to receive the head of a tool shank. Otherwise the structure shown in Fig. 4 is the same as that shown in Figs. 1, 2 and 3.

In Fig. 5 is shown a drill head 30 together with a fragment of the shank 29 thereof. Said shank may be shaped in its upper end portion like the shank 23 of Fig. 2 or it may be so shaped as to fit into the socketed end portion 28 of the shank 23' of Fig. 6. The hexagonal end portion 26' of this shank will be better adapted to stay in its mounted position if provided with a round headed stud like the stud 25 of Fig. 2.

In Fig. 7 is shown another modification wherein the split thimble 40, its ears 40a and the pivot pin 41 are the same as the corresponding parts shown in Figs. 1 to 3. But the block 42 shown in Fig. 7 serves as the sole means for attaching the headed portion 43 of the tool 44, said block having a lateral recess 42a which cooperates with a bottom slot 42b to receive the tool's head.

Figs. 8 and 9 show, respectively, in section and bottom plan, a modification of the bottom part 16b of the block 16 of Figs. 1 to 3. In this view, the modified block 45 has its convex face provided with a plurality of circular grooves 46 concentric to a concave central recess 47 like the recess 16c in the block 16.

In all the embodiments of the invention shown, including the modification shown in Fig. 7, a mounting means is provided for having detachably connected to it the head of a tool, said means including a member, one side portion of which is connected with the thimble by a pivot pin (said member in Fig. 1 including both the block 16 and cup 20), and the opposite side portion of which has a bottom with a tapered slot leading into it from one side and a recess located inwardly of said slot combining with the latter to form a cut-out into which the head of a tool together with the adjacent part of the shank thereof may be laterally moved, the shank of the tool when thus positioned being rotatable by the thumb and second finger of the hand of the workman, the index finger of which is connected with the device in the aforesaid manner.

I claim:

1. In combination, a thimble adapted to receive the end portion of a workman's index finger, a cylindrical block having an upper end portion pivotally connected with a side portion of said thimble, said block having a radially projecting flange around the opposite end portion thereof, a cup surrounding said block and having a uniform internal diameter with a working fit around said flange, a coil spring surrounding said block, one of the ends of said spring abutting against said flange, a pin extending diametrically through a slot in said block and through the open end portion of said cup and forming an abutment for the end of said spring which is directed toward said thimble, said cup having a bottom portion laterally recessed in a manner to removably admit the head of a tool shank to a position wherein said head is gripped between the bottom of said cup and the adjacent end of said block while the latter is urged toward said bottom by the aforesaid spring.

2. The subject matter of claim 1, and that end of said cylindrical block which is directed toward the bottom of said cup having in it a recess to cooperate with the cup's bottom to engage and hold in place the head of the inserted tool shank.

LOUIS FRANK.

REFERENCES CITED

The following references are of record in the file of this patent:

UNITED STATES PATENTS

| Number | Name | Date |
| --- | --- | --- |
| 268,460 | Colvin | Dec. 5, 1882 |
| 1,392,810 | Zifferer | Oct. 4, 1921 |
| 1,596,317 | Skinner | Aug. 17, 1926 |
| 1,834,945 | Hafford | Dec. 8, 1931 |
| 2,440,854 | Frank | May 4, 1948 |
| 2,449,167 | Hopewell | Sept. 14, 1948 |